(12) United States Patent
Grieve et al.

(10) Patent No.: US 7,037,615 B2
(45) Date of Patent: May 2, 2006

(54) TRAPPING METHOD AND SYSTEM FOR ENERGY CONVERSION DEVICES

(75) Inventors: Malcolm James Grieve, Fairport, NY (US); Jeffrey G. Weissman, Tulsa, OK (US); Subhasish Mukerjee, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 341 days.

(21) Appl. No.: 09/781,687

(22) Filed: Feb. 12, 2001

(65) Prior Publication Data

US 2002/0136936 A1   Sep. 26, 2002

(51) Int. Cl.
*H01M 8/04* (2006.01)

(52) U.S. Cl. .................. 429/34; 429/17; 137/99.5
(58) Field of Classification Search .................. 429/17, 429/16, 20, 34; 137/99.5
See application file for complete search history.

(56) References Cited

U.S. PATENT DOCUMENTS

| | | | |
|---|---|---|---|
| 4,442,078 A * | 4/1984 | Jalan | ............... 423/230 |
| 4,816,353 A | 3/1989 | Wertheim et al. | |
| 4,921,765 A | 5/1990 | Gmeindle et al. | |
| 5,130,097 A | 7/1992 | Bissett | |
| 5,348,921 A | 9/1994 | Bissett et al. | |
| 5,686,196 A | 11/1997 | Singh et al. | |
| 5,712,052 A | 1/1998 | Kawatsu | |
| 5,925,476 A | 7/1999 | Kawatsu | |
| 6,083,637 A | 7/2000 | Walz et al. | |
| 6,230,494 B1 | 5/2001 | Botti et al. | |
| 6,403,243 B1 * | 6/2002 | Herdeg | ............... 429/13 |
| 6,609,582 B1 | 8/2003 | Botti et al. | |

FOREIGN PATENT DOCUMENTS

| | | | |
|---|---|---|---|
| DE | 1258842 | | 1/1968 |
| EP | 0435736 | | 7/1991 |
| JP | 62283563 | | 12/1987 |
| JP | 02098065 | | 4/1990 |
| JP | 05186202 | | 7/1993 |
| JP | 06111844 | | 4/1994 |
| JP | 07233379 | | 9/1995 |
| JP | 08298130 | | 11/1996 |
| JP | 07-258321 | * | 3/1997 |
| JP | 09-075721 | * | 3/1997 |
| JP | 11054139 | | 2/1999 |
| WO | 9946032 | | 9/1999 |

* cited by examiner

*Primary Examiner*—Mark Ruthkosky
(74) *Attorney, Agent, or Firm*—Paul L. Marshall

(57) ABSTRACT

A trap for an energy conversion device comprises a trapping system comprising a filter element and a trap element, and fluidly coupled to a reforming system. The trapping system is monitored by a combination of devices including an on-board diagnostic system, a temperature sensor, and a pressure differential sensor, which can individually or in combination determine when to regenerate the trapping system. The method for trapping sulfur and particulate matter using the trapping system comprises dispensing fuel into the energy conversion device. The fuel is processed in a reformer system to produce a reformate. The reformate is introduced into the trapping system and filtered to remove particulate matter and sulfur.

19 Claims, 3 Drawing Sheets

TRAPPING METHOD AND SYSTEM FOR ENERGY CONVERSION DEVICES

TECHNICAL FIELD

This disclosure relates to energy conversion devices, and, more particularly, relates to a trapping system for energy conversion devices.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, etc.) to significant toxic and $CO_2$ emission improvements (natural gas, etc.). Hydrogen has the potential as a nearly emission free internal combustion engine fuel (including $CO_2$ if it comes from a non-fossil source).

The automotive industry has made very significant progress in reducing automotive emissions. This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells (SOFC), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electrical power. However, each individual electrochemical cell generates a relatively small voltage. Higher voltages are attained by electrically connecting a plurality of electrochemical cells in series to form a stack.

The fuel cell stack also includes conduits or manifolds to allow passage of the fuel and oxidant into the stack, and byproducts, as well as excess fuel and oxidant, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes, typically create oxidant and fuel flows across the electrodes that are perpendicular to one another.

The long term successful operation of a fuel cell depends primarily on maintaining structural and chemical stability of fuel cell components during steady state conditions, as well as transient operating conditions such as cold startups and emergency shut downs. The support systems are required to store and control the fuel, compress and control the oxidant and provide thermal energy management. A SOFC can be used in conjunction with a reformer that converts a fuel to hydrogen and carbon monoxide (the reformate) usable by the fuel cell. Typically, reformer technologies operate at high temperatures (e.g., about 600 C–800° C. or greater). Three types of reformer technologies are typically employed (steam reformers, dry reformers, and partial oxidation reformers) to convert hydrocarbon fuel (methane, propane, natural gas, gasoline, etc) to hydrogen using water, carbon dioxide, and oxygen, respectfully, with byproducts including carbon dioxide and carbon monoxide, accordingly. In some regions of the world, hydrocarbon fuel mixtures contain sulfur, e.g., in an amount of about 800 to about 10,000 parts per million, as an additive, or, in some instances, as an impurity. Hydrocarbon fuel rich in sulfur, can degrade the reformers catalyst substrate, this affecting the long term successful operation of the fuel cell. In addition the catalyst employed in the reformer can be particularly intolerant to sulfur, which can also adversely affect reformer efficiency, and reduce reformer life. In addition, if coking or sooting occurs, due to a premature gas phase reaction occurring before the fuel enters the reformer, then the resulting particulate matter can enter the SOFC and degrade its efficiency and performance.

Consequently, there exists a need for a system, and method for trapping impurities and particulate matter in energy conversion devices.

SUMMARY

The drawbacks and disadvantages of the prior art are overcome by the system and method for trapping impurities and particulate matter in energy conversion devices. The system comprises a trap for use with energy conversion devices comprising a trapping system comprising a filter element and a trap element and a reforming system. The reforming system is fluidly coupled to the trapping system, with said trapping system positioned after said reforming system.

The method comprises a method for trapping particulate matter and sulfur in an energy conversion device comprising dispensing a fuel into the energy conversion device; processing the fuel in a reformer system to produce a reformate; coupling the reformer to a trapping system; and filtering the reformate using the trapping system.

BRIEF DESCRIPTION OF THE DRAWINGS

Referring now to the drawings, which are meant to be exemplary not limiting, wherein like elements are numbered alike in the several figures.

DESCRIPTION OF THE PREFERRED EMBODIMENT

To meet the needs of mobile systems, fuel cells need to rapidly start, requiring an immediate source of fuel. Conventional fuels, such as gasoline, need to be reformed into acceptable SOFC fuels, such as hydrogen and carbon monoxide. The reforming process pretreats the fuel for efficient use by the fuel cell system. Since different types of fuel cell systems exist, including tubular or planar, any reference to components of a particular cell configuration are intended to also represent similar components in other cell configurations where applicable.

Figure 1:
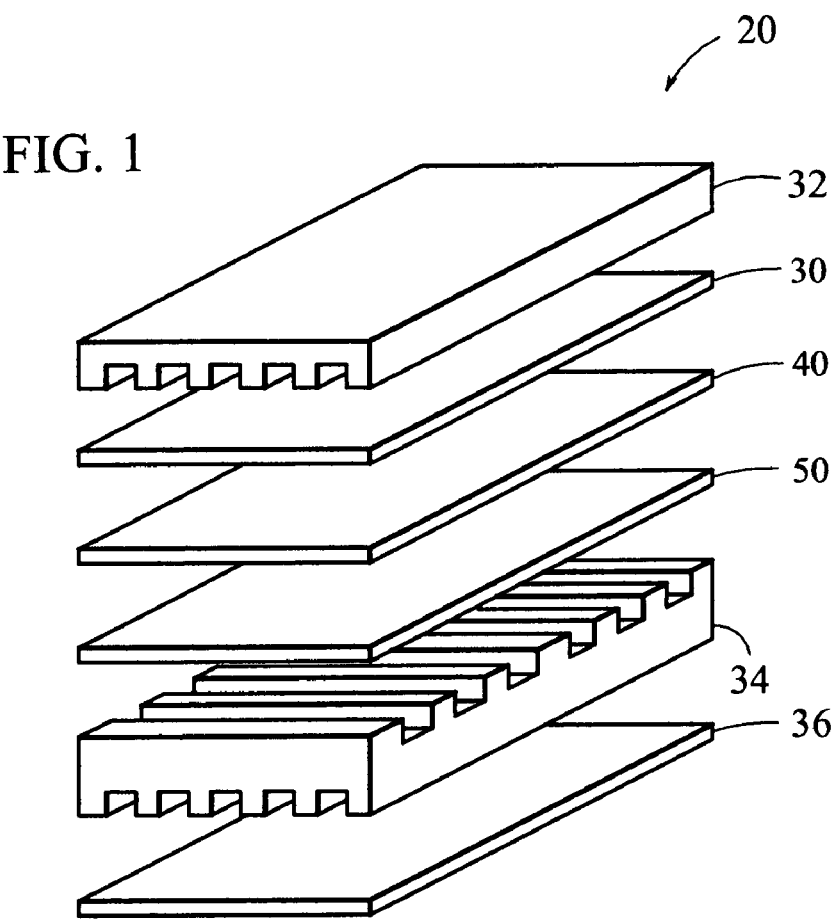
FIG. 1 is a perspective view of an electrochemical cell of a SOFC.

One configuration of a fuel cell includes a stack of planar SOFC, with an electrochemical cell 20 of a stack, illustrated in FIG. 1. A fuel electrode (or anode) 30 and an oxygen electrode (or cathode) 50 are disposed on opposite sides of a solid electrolyte 40. Two interconnects (or current collectors) 32, 34 are disposed adjacent to the electrochemical cell 20 comprising the anode 30, electrolyte 40, and cathode 50. Anode 30 is disposed adjacent to interconnect 32 to illustrate the placement of and ability to stack several electrochemical cells connected to electrochemical cell 20. Oxidant gases, such as oxygen or air, can be introduced to the cathode side of the cell, flowing as illustrated by the oxidant flow arrows 64, 64', 64" (See FIG. 2). The oxidant receives the flowing electrons (e⁻) and converts them into oxygen ions (O⁻²), which diffuse through the electrolyte 40 to the anode 30, as depicted in the following reaction:

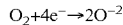

$O_2 + 4e^- \rightarrow 2O^{-2}$

At the anode, the oxygen ions react with a fuel, such as hydrogen, carbon monoxide, or methane, which was introduced to the electrochemical cell 20 as illustrated by the fuel flow arrows 62, 62', 62". The reaction of the fuel and oxygen ions, producing electrons (e⁻), which flow from the electrochemical cell 20 to the external circuit 70 to produce the electrical load and back to the cathode 50. The fuel/oxygen ion reaction is depicted in the following reactions:

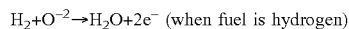

$H_2 + O^{-2} \rightarrow H_2O + 2e^-$ (when fuel is hydrogen)

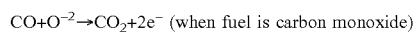

$CO + O^{-2} \rightarrow CO_2 + 2e^-$ (when fuel is carbon monoxide)

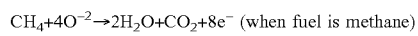

$CH_4 + 4O^{-2} \rightarrow 2H_2O + CO_2 + 8e^-$ (when fuel is methane)

Unreacted fuel and byproducts, such as water, carbon monoxide, exit the electrochemical cell 20 in the fuel stream, as illustrated by fuel stream arrow 66, while excess oxidant exits the electrochemical cell 20, as illustrated by oxidant stream arrow 68. Thermal energy is also a byproduct that exits the electrochemical cell 20 in the fuel steam 66.

Figure 2:
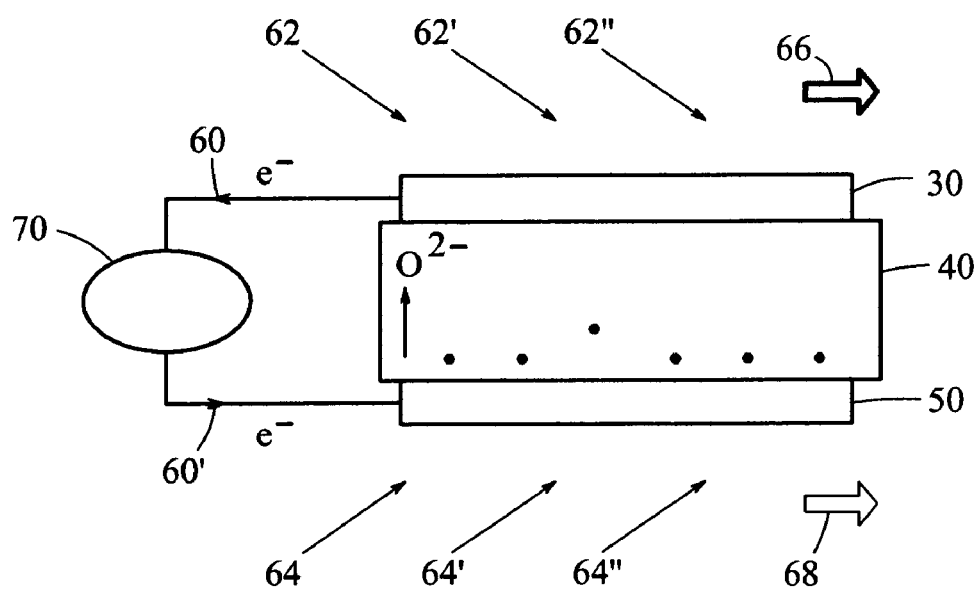
FIG. 2 is a schematic of an electrochemical cell of a SOFC in operation.

Basically, the electrolyte 40 conducts these oxygen ions (O⁻²) between the anode 30 and the cathode 50, maintaining an overall electrical charge balance. As illustrated in FIG. 2, the cycle of flowing electrons (e⁻) from the anode 30 through the external circuit 70 to the cathode 50 creates electrical energy. This electrical energy, electrical power, can be directly utilized by the vehicle to power various electrical devices, including, but not limited to, lights, resistive heaters, blowers, air conditioning compressors, starter motors, traction motors, computer systems, radio/stereo systems, and a multiplicity of sensors and actuators, among others.

To facilitate the reaction in the fuel cell, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, combinations comprising at least one of the foregoing methods, and the like; and combinations comprising at least one of the foregoing fuels. The preferred fuel is typically based upon the power density of the engine, with lighter fuels, i.e. those which can be more readily vaporized and/or conventional fuels which are readily available to consumers, generally preferred.

The processing or reforming of hydrocarbon fuels, such as gasoline, is completed to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into hydrogen (H₂) and byproducts (e.g. carbon monoxide (CO) and carbon dioxide (CO₂)). Common approaches include steam reforming, partial oxidation, and dry reforming.

Steam reforming systems involve the use of a fuel and steam (H₂O) that is reacted in heated tubes filled with catalysts to convert the hydrocarbons into principally hydrogen and carbon monoxide. An example of the steam reforming reaction is as follows:

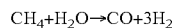

$CH_4 + H_2O \rightarrow CO + 3H_2$

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 600° C. to about 1200° C., and preferably, about 700 C to about 1050 C. The heat required to drive the reaction is typically supplied by burning a portion of the fuel. Catalysts have been used with partial oxidation systems (catalytic partial oxidation) to promote conversion of various sulfur-free fuels, such as ethanol, into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

$$CH_4 + \frac{1}{2}O_2 \rightarrow CO + 2H_2$$

Dry reforming involves the creation of hydrogen and carbon monoxide in the absence of water, for example using carbon dioxide. An example of the dry reforming reaction is depicted in the following reaction:

$$CH_4 + CO_2 \rightarrow 2CO + 2H_2$$

The reformer 100 can be any type of reformer. Within the reformer 100, catalysts react with the unreformed fuel with water to produce hydrogen and carbon monoxide. The reformer catalyst can be any catalyst capable of reforming the particular fuel to hydrogen, including, but not limited to, precious metals such as platinum, palladium, rhodium, nickel, iron, cobalt, molybdenum, tungsten, vanadium, niobium, tantalum, their oxides and sulfides, and combinations comprising at least one of the foregoing precious metals and the like. In addition, the reformer catalyst can also include a washcoat material such as aluminum oxide, silicon oxide, zirconium oxide, titanium oxide, cerium oxide, combinations comprising at least one of the following washcoat materials, and the like, and supported on a support such as a monolith, substrate, brick, and the like.

Figure 3:
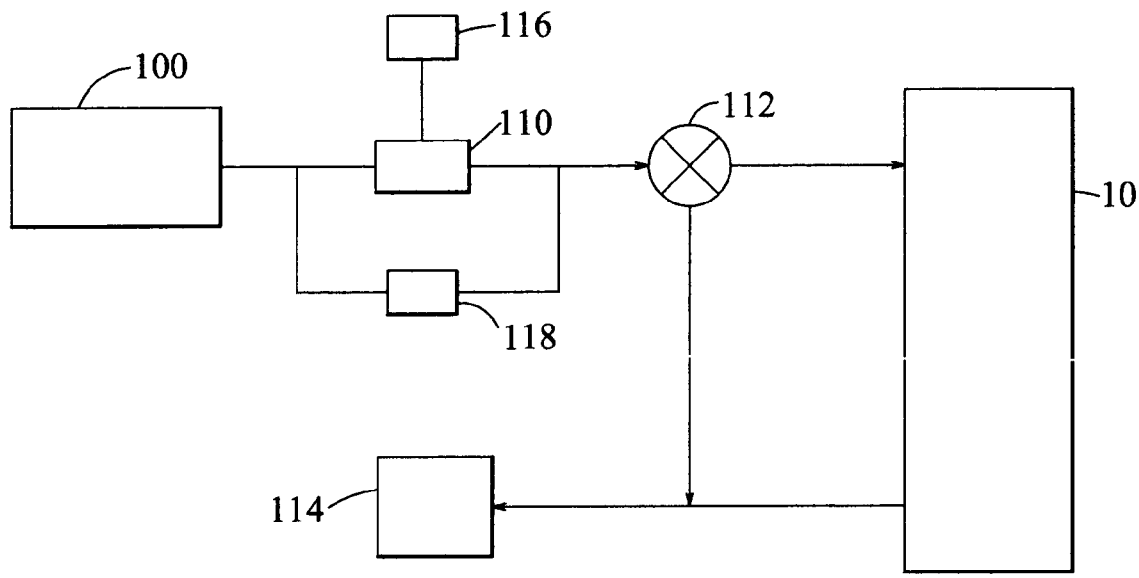
FIG. 3 is a flow diagram of an energy conversion device employing a particulate matter trap in conjunction with a reformer system and a SOFC.

To maintain the SOFC's efficiency a regenerable particulate matter trap 110 can be placed, for example, before an SOFC 10, and between the reformer 100 and reformate control valve 112 as illustrated in FIG. 3. However, the regenerable particulate matter trap 110 can be placed in any combination with the reformer 100 and reformats control valve 112, with the regenerable particulate matter trap 110 preferably positioned after and in fluid communication with the reformer 100. The reformate control valve 112 is preferably positioned in fluid communication with the SOFC 10 and a waste energy recovery burner 114. The reformate control valve 112 can divert the reformate flow into the SOFC 10 to power the system and/or a waste energy recovery burner 114 to warm up the system. The SOFC 10, in turn, can direct the reformate flow into the waste energy recovery burner 114. A conventional temperature sensor 116 and a conventional pressure differential sensor 118 can be positioned in electrical communication with the regenerable particulate matter trap 110 to estimate the sulfur level content of the trap 110, and control and schedule the trap's regeneration based on those levels. The sulfur and particulate matter content of the particulate matter trap 110 can be approximated using the temperature sensor 116 and pressure differential sensor 118 in conjunction with an on-board diagnostic system (not shown), or, alternatively, with a chemical sensor, or measured off-board at service intervals. The sulfur content measurement, pressure differential measurements and/or reformate quality measurements, can indicate when the particulate matter trap 110 must be regenerated. Regeneration can occur automatically at regular intervals such as at every start-up of the energy conversion device, or periodically such as at service intervals at the dealer level, or as required.

Figure 4:
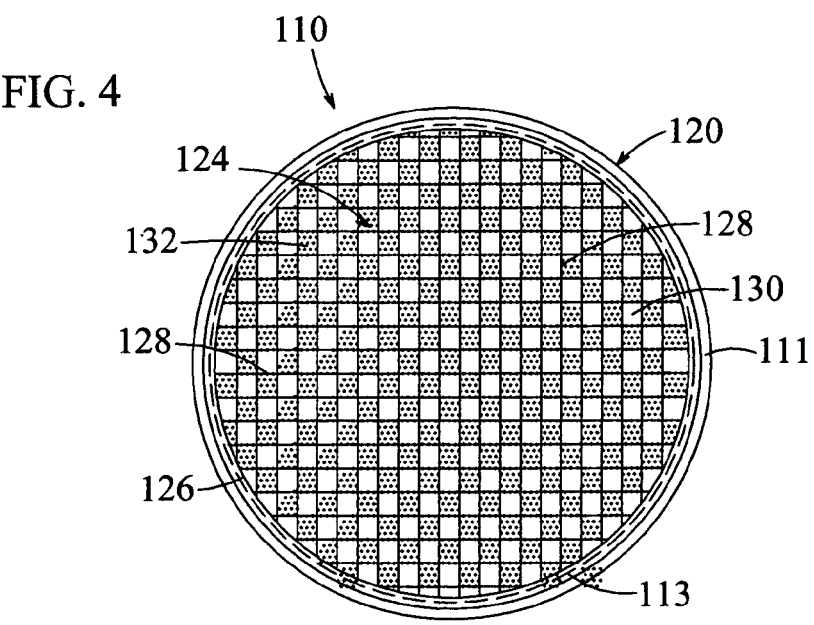
FIG. 4 is a cross-sectional end view of the first chamber of the particulate matter trap of FIG. 3.

As illustrated in FIG. 4, the regenerable particulate matter trap 110 can be positioned within a pipe (not shown) located between the reformer 100 and reformate control valve 112. The regenerable particulate matter trap 110 can have a geometry similar to, or substantially similar to the cross-sectional geometry of the pipe that places the reformer 100 and reformate control valve 112 in fluid communication. The particulate matter trap 110 can comprise a shell 111 having one or more chambers, cavities, and the like, and preferably include at least two chambers partitioned or sectioned off to form a first chamber 120 and a second chamber 122. Possible materials for the shell include ferrous materials, such as ferritic stainless steels. Ferritic stainless steels include stainless steels such as the 400-Series, for example, SS-409, SS-439, and SS-441, and alloys, and combinations comprising at least one of the foregoing stainless steels, with grade SS-409 generally preferred. Disposed between the shell 111 and chambers 120 and 122 is an insulation material 113 comprising materials such as fiberglass, intumescent materials, non-intumescent materials, ceramic mats, and/or mica based materials, including combinations comprising at least one of the foregoing insulation materials, and the like.

The first chamber 120 can comprise a conventional wall flow particulate filter 124 (hereinafter "filter element 124"). The filter element 124 can comprise one or more monolith, foams, substrate, support, and the like, comprising a ceramic, metallic, cermet, and carbides, silicides, nitrides, such as silica carbide, silica nitride, and the like, or composite material, and the like, and combinations comprising at least one of the foregoing materials. Such materials preferably possess a sufficient porosity to permit passage of reformate through the monolith walls, and yet filter out a substantial portion, if not all of the particulate matter present in the reformate. In addition, the filter element 124 can optionally include a catalyst material such as precious metals such as platinum, palladium, rhodium, nickel, iron, cobalt, molybdenum, tungsten, vanadium, niobium, tantalum, their oxides and sulfides, and combinations comprising at least one of the foregoing precious metals and the like. In addition, the reformer catalyst can also include a washcoat material such as aluminum oxide, silicon oxide, zirconium oxide, titanium oxide, cerium oxide, and combinations comprising at least one of the following washcoat materials. The filter element 124, as described above, can be supported within the first chamber 120 of the regenerable particulate matter trap 110. The filter element 124, for example, can be first formed as an extruded open-ended ceramic monolith similar to that used, for example, in catalytic converters, after which the monolithic structure is converted into a filter element having alternate passages. The particulate filter 124 provides a surrounding, cylindrical outer wall 126 internally interconnected by a large number of interlaced thin porous internal walls 128. The interlaced wall 128 define internally thereof two groups of parallel passages or channels including respectively inlet channels 130 and outlet channels 132, each extending to opposite ends of the filter element 124.

Both the inlet and outlet channels 130, 132 can have a square cross-section, although, numerous other geometries can be utilized such as multi-sided (e.g., trapezoidal, pentagonal, hexagonal, heptagonal, octagonal, and the like), circular, or elongated (e.g., oval, oblong, and the like). Further, the inlet and outlet channels 130 and 132, respectively, can be arranged, for example, in vertical and horizontal rows (as viewed in cross-section), with the inlet channels 130 alternating with outlet channels 132 in a checkerboard pattern. Thus, each interlaced wall 128 portion of the filter element 124 can be positioned between an inlet channel 130 and an outlet channel 132 along a portion or a substantial portion of each wall's surface, with the exception when an interlaced wall 128 engages another interlaced wall 128, as it does, for example, at the corners of the channels. With the exception of the corner engagement, the inlet channels 130 can be spaced from one another by intervening outlet channels 132, and vice versa.

Figure 5:
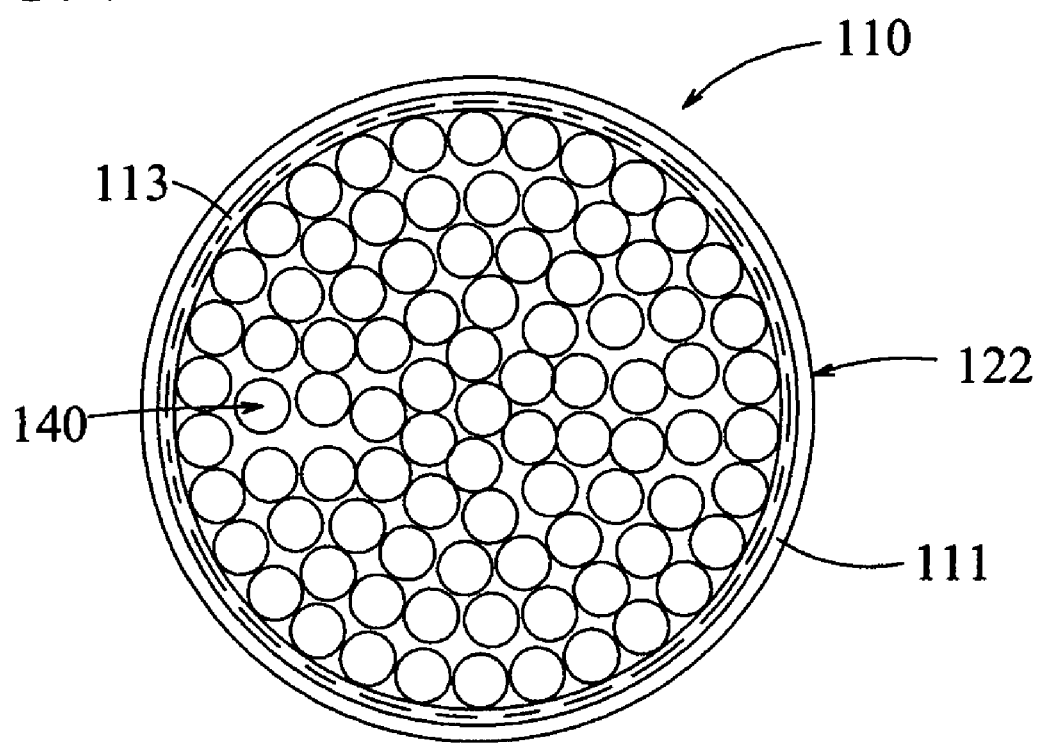
FIG. 5 is a cross-sectional end view of the second chamber of the particulate matter trap of FIG. 3.

The second chamber 122 can comprise a regenerable trap 140 (hereinafter "trap element 140") to filter and remove reformate impurities such as sulfur, hydrogen, sulfides, carbon monoxides, carbon sulfides including, but not limited to, methyl sulfides, ethyl sulfides, propyl sulfides, butyl sulfides, and thiols, mercaptans, disulfides thiophenes, and their derivatives, and the like. (See FIG. 5). The trap element 140 can comprise a monolith, foam, preform, mat, fibrous material, a plurality of beads (See FIG. 5), and the like, comprising a ceramic, metallic, cermet, or composite material, and the like, and combinations comprising at least one of the foregoing, that can support one or more sulfur adsorbing materials. The sulfur adsorption materials can adsorb sulfur from the reformats by one or more methods such as physisorption, selective physisorption, chemisorption, selective chemisorption, chemical reaction, and combinations comprising at least one of the foregoing adsorption methods, and the like. The sulfur trapping process can preferably undergo many sulfur adsorption/desorption cycles with minimal loss of sulfur adsorption capability. Consequently, the sulfur adsorption material will be relatively unaffected by fuel mixture constituents typically present such as carbon monoxide, nitrogen, organic nitrogen compounds derived from the fuel mixture, other fuel additives such as phosphorus and zinc, contaminant metals, and combinations comprising at least one of the foregoing constituents. Possible sulfur adsorber materials, also referred to as active redox materials, comprise transition metals such as nickel, iron, zinc, copper, molybdenum, manganese, vanadium, niobium, cobalt, as well as their alloys and oxides and other materials including carbonates, molecular sieves comprising zeolitic and non-zeolitic matter such as phosphates, molybdates, alumina containing equivalents, and combinations comprising at least one of the foregoing materials, and sodalites, scapolites, cancrinite structure type alumino-silicates, and combinations comprising at least one of the foregoing sulfur adsorber materials. The sulfur absorber material preferably absorbs sulfur within the reformate stream at operating temperatures from about 400° C. to about 800° C., with operating temperatures from about 550° C. to about 750° C. preferred. In addition, the trap element 140 can optionally include a washcoat material such as aluminum oxide, silicon oxide, zirconium oxide, titanium oxide, cerium oxide, combinations comprising at least one of the following washcoat materials, and the like.

As the fuel mixture is consumed by the reformer 100 and converted into reformate, the hydrogen present reduces all or substantially all of the sulfur present. An example of the trapping reaction of the sulfur is as follows:

$$M + H_2S \rightarrow MS + H_2$$

wherein M is an active redox material, as described above, utilized in the particulate matter trap 110. Trapping the sulfur compounds prior to reforming the fuel mixture will result in the removal of the portion of the fuel chemically bonded to the sulfur, thus reducing the system's efficiency. As a result, the particulate matter trap 110 is preferably positioned after the reformer 100 as illustrated in FIG. 3. The reformate can flow through the particulate matter trap 110 such that particulate matter present can be filtered through the filter element 124 of the first chamber 120. As the reformate continues flowing into and through the second chamber 122, the sulfur adsorbing material adsorbs the unstable hydrogen sulfide. The reformats can exit the regenerable particulate matter filter 110 and flow into the SOFC 10 preferably free of particulate matter and sulfur.

When the pressure differential sensor 118 and/or temperature sensor 116 determine the sulfur content of the regenerable particulate matter trap 110 has reached a predetermined concentration, the on-board diagnostic system can regenerate the sulfur adsorption material using several methods including, but not limit to, heating the reformate and/or, adjusting the air to fuel ratio. Regeneration methods can include heating the reformate (e.g., in an oxidizing, reducing, or neutral environment), cooling the reformate (e.g., in an oxidizing, reducing, or neutral environment), or several steps comprising one of the foregoing methods. Listed below are some examples of the regeneration reactions that can take place in the particulate matter trap 110.

(1) $MS + H_2O \rightarrow MO + H_2S$ (oxidizing environment)
$MO + H_2 \rightarrow M + H_2O$ (reducing environment)
(2) $MS + O_2 \rightarrow M + SO_2$ (oxidizing environment)
(3) $MS + H_2 \rightarrow M + H_2S$ (reducing environment)

wherein M is an active redox material, as described above, utilized in the particulate matter trap 110. For example, regeneration can occur when the reformate can be heated in a reducing environment using a gas containing an excess amount of hydrogen, which will remove the trapped sulfur as hydrogen sulfides. In contrast, the reformate can be cooled in an oxidizing environment to restore the oxidizing nature of the sulfur adsorbing material. Ultimately, the regeneration strategy employed will depend upon the sulfur adsorber material and can vary according to the particular application and use.

The system and method for trapping particulate matter and sulfur in energy conversion devices possess several advantages over conventional sulfur/particulate matter traps. Typically, some sulfur/particulate matter traps for energy conversion devices are disposable and must be replaced at regular service intervals. Other sulfur/particulate matter traps are positioned upstream before the reforming system, such that the trap operates using a liquid as a sulfur adsorption material, and filter for particulate matter. Disposable traps require additional maintenance, i.e., time, labor and expenditures borne by the consumer, at regular intervals at the dealer level to function effectively. Liquid based sulfur/particulate matter traps are difficult to construct and maintain, especially when the liquid sulfur adsorption material must be regenerated. At times, the liquid based sulfur/particulate matter traps are disposed rather than regenerated.

In contrast, the post reformer sulfur/particulate matter trap provides a cost effective system and method for trapping and removing both sulfur and particulate matter from the reformate. The sulfur adsorption material can be regenerated by adjusting the air-fuel ratio of the reformate, or by increasing the system's operating temperature, thus alleviating the need for additional maintenance at regular service intervals.

While preferred embodiments have been shown and described, various modifications and substitutions may be made thereto without departing from the spirit and scope of the invention. Accordingly, it is to be understood that the fuel reformer system has been described by way of illustration only, and such illustrations and embodiments as have been disclosed herein are not to be construed as limiting to the claims.

What is claimed is:

1. A trap for use with energy conversion devices comprising:
   a trapping system comprising a filter element and a trap element, said filter element including a particulate filter disposed in a first chamber of said trapping system, said particulate filter including a washcoat disposed on a filter material;
   a reforming system; and
   wherein said reforming system is fluidly coupled to said trapping system, with said trapping system positioned after said reforming system.

2. The trap of claim 1, further comprising a temperature sensor in electrical communication with said trapping system.

3. The trap of claim 1, further comprising a pressure differential sensor is coupled to said trapping system.

4. The trap of claim 1, further comprising a reformate control valve is coupled to said trapping system.

5. The trap of claim 4, wherein said reformate control valve is coupled to said trapping system.

6. The trap of claim 4, wherein said reformate control valve is coupled to a waste energy recovery burner device.

7. The trap of claim 1, further comprising a solid oxide fuel cell coupled to a reformate control valve, wherein said reformate control valve is coupled to said trapping system.

8. The trap of claim 1, further comprising a waste energy recovery burner device coupled to a reformate control valve, wherein said reformate control valve is coupled to said trapping system.

9. The trap of claim 1, wherein said particulate filter further comprises a material having a sufficient porosity to permit passage of reformate, and filter and remove a particulate matter from a reformate.

10. The trap of claim 1, wherein said particulate filter further comprises a filter material selected from the group consisting of ceramic, metallic, cermet, carbides, suicides, nitrides, composites, and combinations comprising at least one of the foregoing materials.

11. The trap of claim 1, wherein said particulate filter further comprises a catalyst disposed on a filter material.

12. The trap of claim 11, wherein said catalyst further comprises a catalyst material selected from the group consisting of platinum, palladium, rhodium, nickel, iron, cobalt, molybdenum, tungsten, vanadium, niobium, tantalum, their oxides and sulfides, and combinations comprising at least one of the foregoing catalyst materials.

13. The trap of claim 1, wherein said washcoat further comprises a washcoat material selected from the group consisting of aluminum oxide, silicon oxide, zirconium oxide, titanium oxide, cerium oxide, and combinations comprising at least one of the foregoing washcoat materials.

14. The trap of claim 1, wherein said trap element further comprises a sulfur adsorber material selected from the group consisting of nickel, iron, zinc, copper, molybdenum, manganese, vanadium, niobium, cobalt, their alloys and oxides, and combinations comprising at least one of the foregoing sulfur adsorber materials.

15. The trap of claim 1, wherein said trap element further comprises a sulfur adsorber material selected from the group consisting of carbonates zeolitic matter, non-zeolitic matter, and combinations comprising at least one of the foregoing sulfur adsorber materials, wherein said non-zeolitic matter is selected from the group consisting of phosphates, molybdates, alumina containing equivalents, and combinations comprising at least one of the foregoing non-zeolitic matter.

16. The trap of claim 1, wherein said trap element further comprises a sulfur adsorber material selected from the group consisting of sodalites, scapolites, cancrinite structure type alumino-silicates, and combinations comprising at least one of the foregoing sulfur adsorber materials.

17. The trap of claim 1, wherein said trapping system further comprises a first chamber and a second chamber, wherein said first chamber further comprises said filter element, wherein said second chamber further comprises said trap element.

18. The trap of claim 1, wherein said trap element further comprises a sulfur adsorber material.

19. The trap of claim 18, wherein said sulfur adsorber material is selected from the group consisting of nickel, iron, zinc, copper, molybdenum, manganese, vanadium, niobium, cobalt, their alloys and oxides, and combinations comprising at least one of the foregoing sulfur adsorber materials.

* * * * *